United States Patent [19]

Rivette

[11] 4,362,238
[45] Dec. 7, 1982

[54] SELECTIVE DRIVE ARRANGEMENT FOR ROLLER CONVEYOR

[75] Inventor: Gerard B. Rivette, Mission Hills, Kans.

[73] Assignee: Mid-West Conveyor Company, Kansas City, Kans.

[21] Appl. No.: 139,029

[22] Filed: Apr. 10, 1980

[51] Int. Cl.³ .......................................... B65G 13/06
[52] U.S. Cl. .................................. 198/781; 198/789
[58] Field of Search ....................... 198/781, 789–791, 198/460; 474/62

[56] References Cited

U.S. PATENT DOCUMENTS

| | | |
|---|---|---|
| 871,340 | 11/1907 | Hrdina . |
| 3,610,406 | 10/1971 | Fleischauer et al. . |
| 3,650,375 | 3/1972 | Fleischauer et al. . |
| 3,696,912 | 10/1972 | Fleischauer et al. .............. 198/781 |
| 3,799,325 | 3/1974 | Benson . |
| 3,840,110 | 10/1974 | Mol et al. ........................... 198/781 |
| 3,951,255 | 4/1976 | Shuttleworth et al. . |
| 3,961,700 | 6/1976 | Fleischauer . |
| 4,111,087 | 9/1978 | Pankratz et al. ..................... 83/408 |
| 4,164,998 | 8/1979 | De Good et al. ................... 198/781 |
| 4,196,312 | 4/1980 | De Good ............................ 198/781 |

FOREIGN PATENT DOCUMENTS 52-55181  5/1977  Japan .................................... 198/781

Primary Examiner—Andres Kashnikow
Assistant Examiner—Douglas D. Watts
Attorney, Agent, or Firm—Litman, Day and McMahon

[57] ABSTRACT

An arrangement for selectively applying driving power to a group of conveyor rollers in a conveyor having a longitudinally extending power or drive shaft including a pair of sheaves or pulleys connected to opposite members of a clutch. One of the sheaves is a drive sheave and is coupled by an endless power-take-off belt to the drive shaft. The other sheave is a driven sheave and is engaged with an endless roller drive belt which drivingly engages selected rollers, such as the rollers of an accumulation zone of an accumulation conveyor. A switching device, such as a signal roller positioned in another accumulation zone, is operatively connected to the clutch to cause actuation or deactuation thereof to thereby selectively transfer rotary power from the drive shaft through the sheaves and roller drive belt to the selected rollers.

2 Claims, 4 Drawing Figures

SELECTIVE DRIVE ARRANGEMENT FOR ROLLER CONVEYOR

BACKGROUND OF THE INVENTION

1. Field of the Invention

The present invention relates to drive arrangements for roller conveyors and, more particularly, to such an arrangement wherein rotary power is taken by a single belt from a longitudinal shaft and transmitted through a clutch to a roller drive belt engaged with the rollers.

2. Description of the Prior Art

Arrangements for propelling the rollers on roller conveyors include the type wherein the rollers are engaged and driven by long endless belts, each belt being driven by a motor. In another type a long drive shaft extending longitudinally of the conveyor is connected to individual rollers by endless belts twisted 90° and drivingly engaging the drive shaft and the rollers.

Problems associated with the longitudinal drive shaft type of arrangement result from the drive shaft being long and heavy and generally not easily disassembled. Further, the belts or O-rings are endless, whereby replacement is laborious because of the necessity of disconnecting the shaft to slip new belts thereon and of disengaging the belts from the rollers and sliding them along the shaft to fill in the positions of the broken or worn belts.

One solution to this problem is to employ the plurality of shorter shafts which are selectively driven by frictional or geared connection to the main shaft, the shorter shafts each being connected by endless belts to the individual rollers. By this means belt replacement is simplified somewhat. The use of the shorter shafts is further convenient for use on accumulation conveyors with the rollers in each accumulation zone driven by the same short shaft. However, the coupling of each roller to a shaft with an individual belt results in a significant quantity of belts which must be employed and maintained.

SUMMARY AND OBJECTS OF THE INVENTION

The present invention reduces the number of belts required to be employed in the above type of conveyors by propelling the groups of rollers by a single endless belt engaged with the lower surfaces thereof. The drive belt is mounted on sheaves or rollers with one sheave on a shaft having a clutch therein. On the other side of the clutch is a second or drive sheave which is connected to the main longitudinal shaft by a single endless belt which is twisted 90°. This arrangement, therefore, requires only two belts per group of rollers.

The principal objects of the present invention are: to provide an improved selective drive arrangement for a type of roller conveyor wherein driving power for the rollers is provided by a drive shaft extending longitudinally of the conveyor; to provide such a drive system wherein driving power is transmitted from the drive shaft to the conveyor rollers by means of an endless belt engaged with the drive shaft and twisted 90° to engage a drive sheave which is coupled to a driven sheave by a clutch, the driven sheave engaging an endless roller drive belt; to provide such a drive system for selective propulsion of the rollers in each accumulation zone of an accumulation conveyor; to provide such a drive system wherein engagement of a first article with a signal roller in each relatively downstream accumulation zone effects disengagement of the drive to the rollers in the adjacent upstream zone to prevent the collision of an article in the upstream zone with the first article; to provide such a drive system which is adaptable to the requirements of many types of roller conveyors; and to provide such a roller conveyor drive system which is economical to manufacture, positive in operation, capable of long operating life, and which is particularly well adapted for its intended purpose.

Other objects and advantages of the present invention will become apparent from the following description taken in connection with the accompanying drawings wherein are set forth, by way of illustration and example, certain embodiments of the present invention.

The drawings constitute a part of the specification, include an examplary embodiment of the present invention, and illustrate various objects and features thereof.

DETAILED DESCRIPTION OF THE PREFERRED EMBODIMENT

Figure 1:
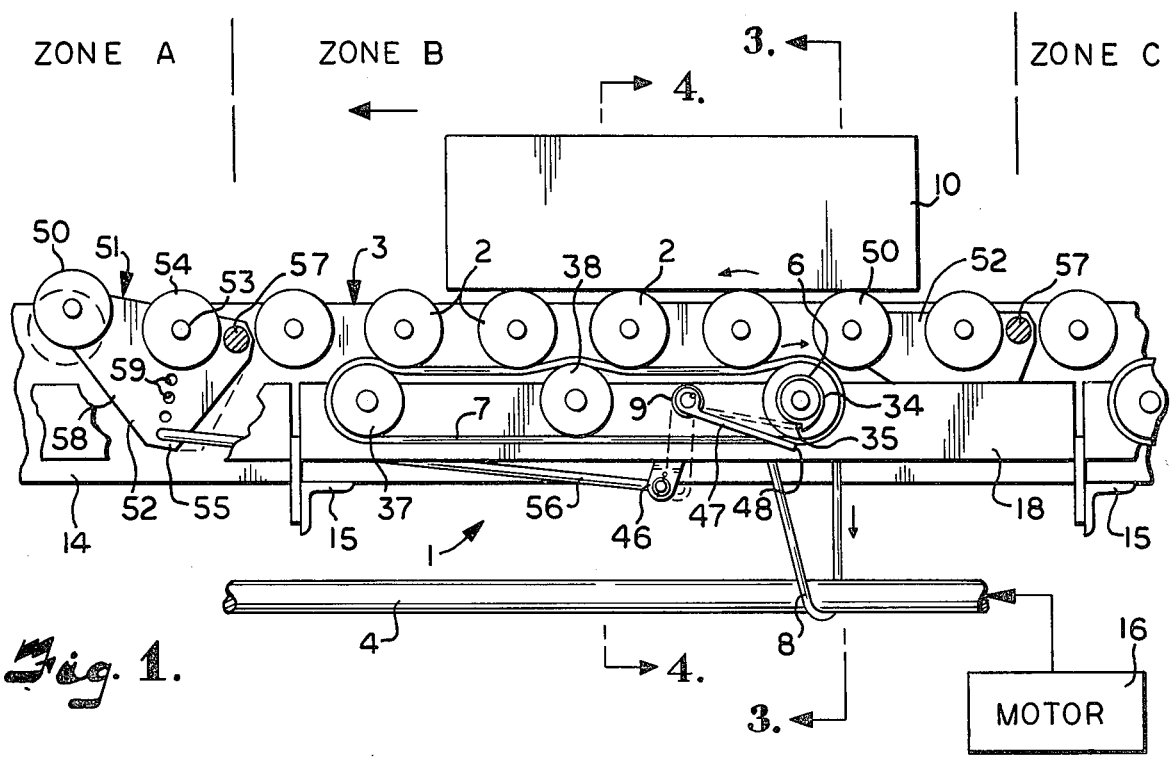
FIG. 1 is a side elevational view of the conveyor drive arrangement embodying the present invention with one of the conveyor side rails removed to illustrate details thereof.
Figure 2:
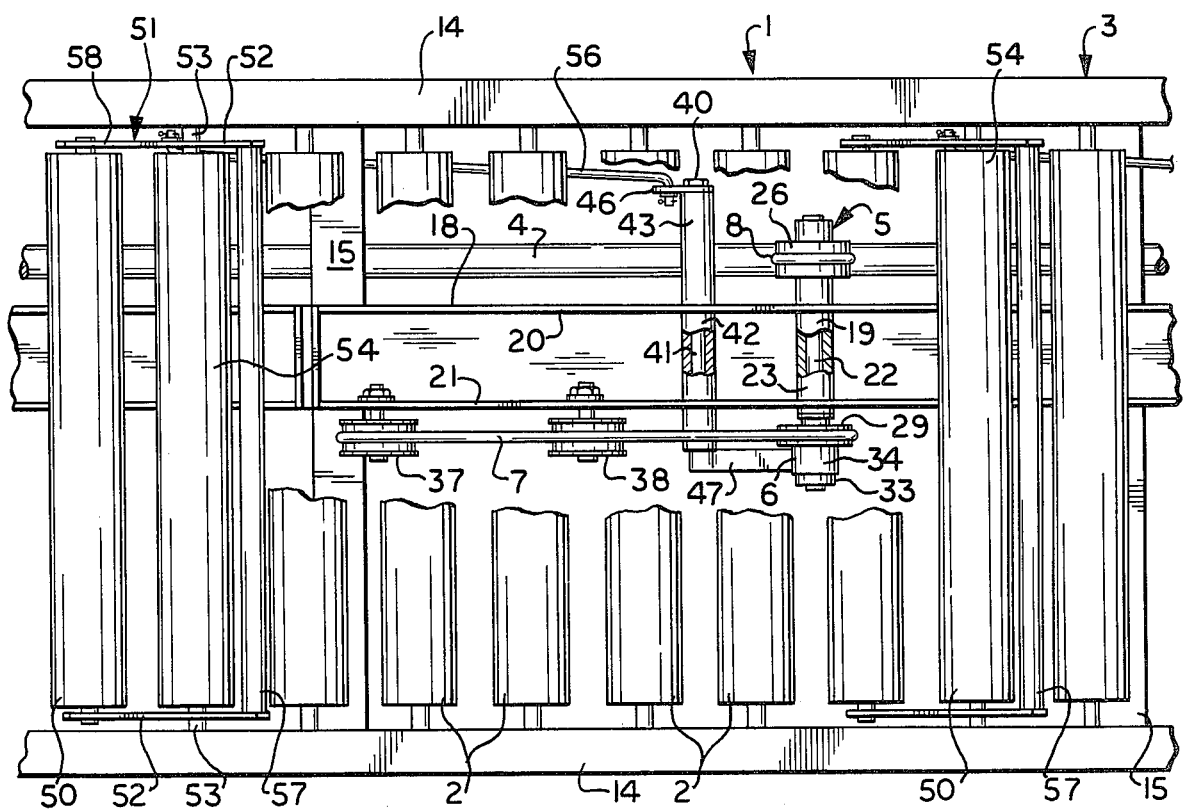
FIG. 2 is a top plan view of a section of the accumulation conveyor with the rollers broken away to show details of the arrangement.

Referring to the drawings in more detail:

The reference numeral 1 generally designates a drive arrangement for selectively applying driving rotation to a plurality of conveyor rollers 2 of a roller conveyor 3. The arrangement 1 generally comprises: a drive shaft 4 extending longitudinally of the conveyor 3; a set of sheaves coupled by a clutch 6; a roller drive belt 7 engaged with one of the sheaves 5; a power-take-off belt 8 engaged with the other sheave; and clutch control means 9 connected to the clutch 6 to selectively actuate same.

The arrangement 1 is particularly applicable in an accumulation conveyor, such as the conveyor 3 wherein the rollers 2 are divided into groups or zones, and wherein the presence of an article 10 in one zone is signaled to the preceding zone to thereby disengage the drive to the rollers therein such that an article which enters said preceding zone is not propelled into the article in the succeeding zone. The arrangement 1 is not to be limited to accumulation conveyors but may be employed advantageously on any type of roller conveyor wherein the drive to relatively short sections of rollers is desired to be controlled.

The conveyor 3 is defined by a pair of elongated side rails 14 connected in parallel relation by a plurality of cross members 15. The rollers 2 are rotatably mounted or journaled at regularly spaced positions along the conveyor 3 between the side rails 14. The rollers 2 may be of the drop-in type or, preferably, are of the snap-in type since the drive belt 7 engages the rollers 2 from beneath. With the snap-in type of rollers, the axles thereof are pressed inwardly, the roller positioned between the side rails, and the axles snapped into apertures provided in the side rails.

The drive shaft 4 is suitably supported beneath the rollers 2 and extends substantially parallel to the side rails 14. The support structure (not shown) for the drive shaft may include framework connected to the side rails 14 and bearings such that the shaft 4 rotates freely. A motor 16 is operatively connected to the shaft 4 and supplies rotary power thereto.

In the illustrated arrangement, the set of sheaves 5, clutch 6, roller drive belt 7, and clutch control means 9 are all mounted on a single frame 18. The frame 18 consists of suitably connected planar members or panels and extends between adjacent cross members 15.

Figure 3:
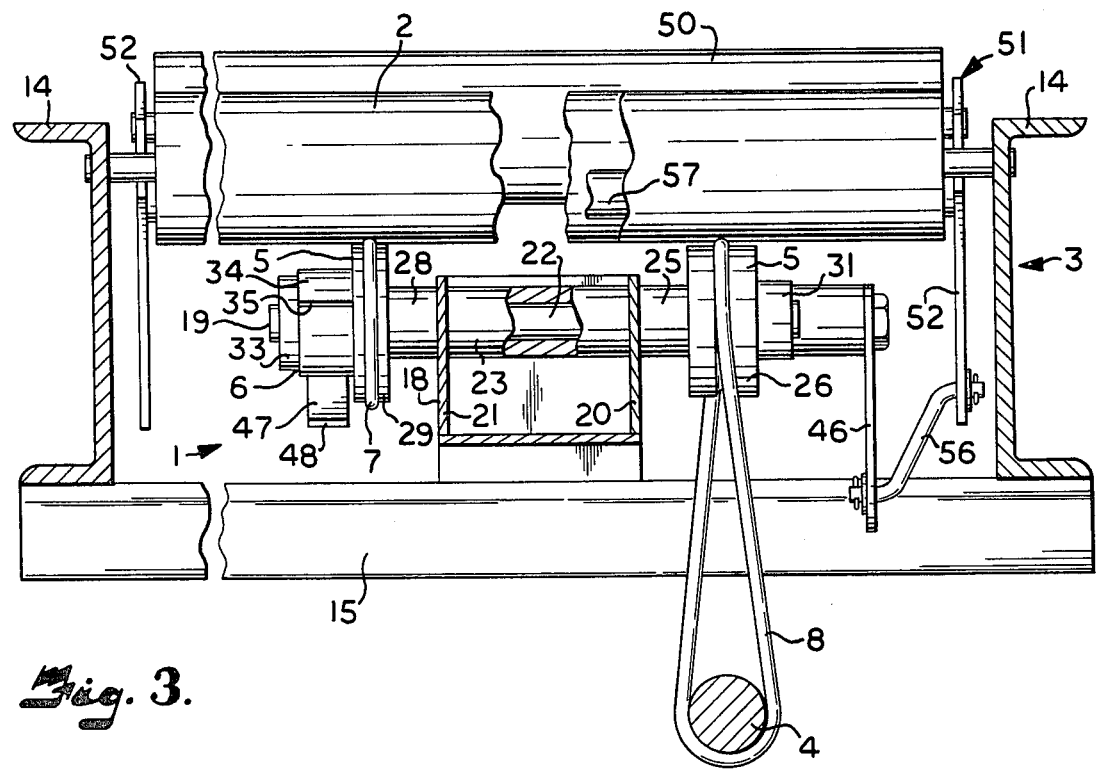
FIG. 3 is an enlarged transverse sectional view taken on line 3—3 of FIG. 1 and showing details of the sheave assembly.

With reference to FIG. 3, a sheave support shaft assembly 19 extends through the opposite side panels 20 and 21 of the frame 18. The shaft assembly 19 includes a center shaft 22 which extends through the side panels with a center spacer sleeve 23 received on the shaft 22 between the side panels 20 and 21. A drive sheave spacer sleeve 25 maintains the spacing between the drive sheave 26 and one of the side panels, such as the panel 20; similarly, a driven sheave spacer sleeve 28 maintains proper spacing between the driven sheave 29 and the side panel 21. A drive sheave retainer 31 is received on the shaft 22 and functions to retain the drive sheave 26 on the shaft 22.

The illustrated clutch 6 consists of an input drum 33, an output drum (not shown) on which the driven sheave 29 is mounted, and a control collar 34 on which the control lug 35 (see FIG. 1) is formed. Both the input drum 33 and the drive sheave 26 are fixed to the shaft 22 and rotate therewith. As long as the lug 35 is free to rotate, the output drum with the driven sheave 29 thereon rotates with the shaft 22. When the rotation of the lug 35 is arrested, the output drum and the input drum 33 are uncoupled such that the driven wheave 29 is no longer driven and comes to a stop.

The side panel 21 provides support for the idler sheaves 37 and 38 which support the roller drive belt 7 in frictional engagement with the selected or zone rollers 2. The end sheave 37 is preferably mounted in a longitudinally elongated slot (not shown) in the panel 21 to provide for adjustment of the tension in the belt 7.

Figure 4:
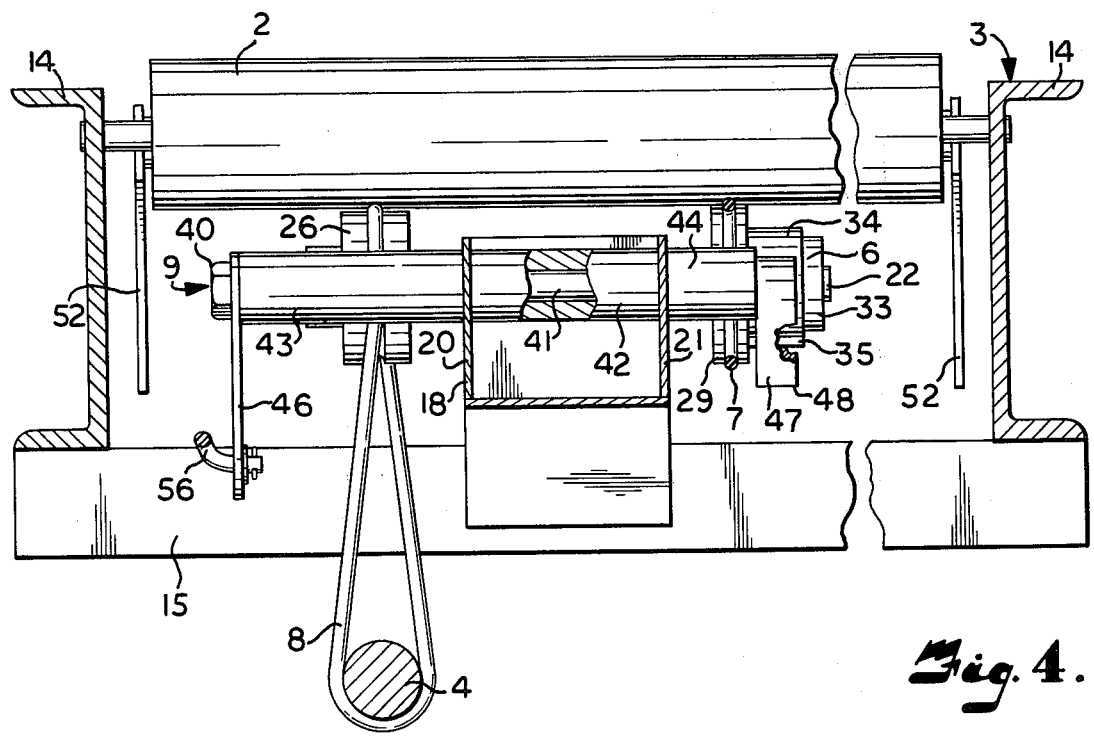
FIG. 4 is an enlarged transverse sectional view taken on line 4—4 of FIG. 1 and showing details of the clutch control arrangement.

Referring to FIG. 4, the clutch control or signal means 9 is operative to cause coupling or uncoupling between the drive sheave 26 and the driven sheave 29. The illustrated signal means 9 includes a lug stop assembly 40 consisting of a center shaft 41, a center spacer sleeve 42, a first end spacer sleeve 43, and a second end spacer sleeve 44. The center shaft 41 extends through the side panels 20 and 21 with the center sleeve 42 received on the shaft 41 between the panels. A lug stop lever 46 is attached to the shaft 41 at one end thereof, and a lug stop arm 47 is attached to the other end. The end sleeve 43 maintains proper spacing between the lug stop arm 46 and the panel 20 while the sleeve 44 maintains spacing between the lug stop arm 47 and the panel 21. Upon proper rotation of the shaft 41, an end 48 of the lug stop arm 47 is brought into position to engage and immobilize or arrest the rotation of the lug 35, thereby uncoupling the drive to the driven sheave 29.

The mechanical signal which operates the lug stop arm 47 is provided by a signal roller 50 which is mounted in the zone immediately downstream of the zone in which the rollers to be controlled thereby are located. In the illustrated arrangement 1, the signal roller 50 is mounted on a crank means 51 which is connected to the lug stop lever 46. The crank means 51 includes a pair of side crank members 52 which are rotatably connected to the side rails 14. The crank members 52 may be mounted as on the axles 53 of a crank mounting roller 54. The axles 53 are received through respective apertures (not shown) in the crank members 52 and then through apertures (not shown) in the side rails 14. The crank members 52 are substantially triangular in shape and have lower corners 53 thereof. A connecting rod or link 56 extends from the lower corner 55 of one of the crank members 52 to the lug stop lever 46. The crank means 51 preferably includes a cross member 57 connected between the crank members 52 to provide rigidity to the crank means 51. The crank member to which the rod 56 is connected preferably includes some means for adjusting the amount of motion that is transferred to the lug stop assembly 40. As shown, the crank member 58 includes a plurality of apertures 59 through which one end of the connecting rod 56 is received. The apertures 59 are formed on a radial line extending from the axis of rotation of the crank member 58.

Referring to FIG. 1, the rollers 2 of and accumulation conveyor 3 are divided into accumulation zones A, B, an C. The length of the zones is related to the length of the articles 10 which the conveyor is intended to transfer, the length being somewhat longer than the length of the article. Accumulation conveyors are usually employed as an approach to a work station (not shown) where it is necessary to perform some operation, such as off-loading, weighing, etc., on the articles one at a time. The accumulation conveyor prevents damaging collisions among the articles awaiting the operation. A switch device (not shown) is provided at the work station such that as an article enters same, the drive to the rollers in the first zone is disengaged whereby the next article entering the first zone is stopped therein.

As an article 10 travels downstream on the conveyor 3, it travels through the zones one at a time. As the article enters a zone, for example zone A, and engages the signal roller 50 therein, the lug stop lever 47 in zone B is moved into position to engage and immobilize the lug 35 of the clutch 6 thereby uncoupling the input drum 33 from the driven sheave 29 whereby the rollers 2 are no longer driven. When the next article 10 arrives in zone B, it rolls to a stop since the rollers are not powered. At the same time, the said next article engages the signal roller 50 in zone B thereby effecting the disengagement of the drive to the rollers 2 in zone C.

It is foreseen that the drive arrangement 1 could be embodied in forms other than as described and illustrated. In particular, the clutch 6 could be some other type of clutch, such as an electrically or pneumatically actuated clutch, or even a disengageable gear train. Likewise, the clutch control means 9 could be some other type of mechanical, electrical, or pneumatic signaling device.

While certain forms of the present invention have been described and illustrated, it is not to be limited thereto except insofar as such limitations are included in the following claims.

What is claimed and desired to be secured by Letters Patent is:

1. In a roller conveyor defined by a plurality of article conveyor rollers transversely journaled between a pair of elongated conveyor side rails and including a longitudinally extending drive shaft supported on said conveyor and having motor means connected thereto to operatively provide driving rotation to said rollers, the improvement comprising:
(a) an endless roller drive belt supported on said conveyor and frictionally engaging selected rollers of said plurality thereof;
(b) sheave means frictionally engaging said drive belt;
(c) an endless power-take-off belt engaging said drive shaft and said sheave means to thereby transfer driving rotation from said drive shaft through said sheave means and said drive belt to said selected rollers;
(d) a drive sheave rotatably supported on said conveyor and having said power-take-off belt frictionally engaged therewith;
(e) a driven sheave rotatably supported on said conveyor substantially coaxial to said drive sheave, said driven sheave having said roller drive belt frictionally engaged therewith;
(f) clutch means interposed between said drive sheave and said driven sheave for selective coupling therebetween;
(g) said clutch means including a lug on an external surface thereof which revolves during the rotation of said sheave means, said clutch means normally effecting engagement between said drive sheave and said driven sheave and effecting disengagement therebetween upon the immobilization of said lug;
(h) signal means operatively connected with said clutch means for selective actuation thereof and including;
 (1) a lug stop member supported on said conveyor and movable into a position to engage and thereby immobilize said lug,
 (2) a signal roller normally positioned above the level of said article conveyor rollers for lowering to said level upon engagement by an article on said conveyor, and
 (3) connecting means connected to said lug stop member and said signal roller and operative to move said lug stop member into a position to engage and immobilize said lug upon the lowering of said signal roller;
(i) said signal roller being supported on crank means rotatably connected to said conveyor;
(j) said lug stop member being rotatably supported on on said conveyor;
(k) a lug stop lever projecting from said lug stop member; and
 (1) a connecting link connected to said crank means and said lug stop lever to thereby rotate said lug stop member into a position to immobilize said lug upon the rotation of said crank means effected by the lowering of said signal roller.

2. In a roller conveyor, an arrangement for selectively applying driving rotation to selected conveyor rollers thereof comprising:
(a) a plurality of article conveyor rollers transversely journaled between a pair of elongated conveyor side rails and defining a roller conveyor for propelling articles in a downstream direction thereon;
(b) a drive shaft extending longitudinally of said conveyor and having motor means connected thereto to rotate said drive shaft;
(c) drive sheave means rotatably supported on said conveyor and operatively driven by said drive shaft;
(d) driven sheave means supported on said conveyor;
(e) an endless roller driven belt frictionally engaging selected rollers of said plurality, said belt also engaging said driven sheave means and being propelled upon rotation thereof to effect driving rotation of said selected rollers;
(f) clutch means disposed between said drive sheave means and said driven sheave means for selective coupling therebetween;
(g) said clutch means including a lug on an external surface thereof, said clutch means normally effecting engagement between said drive sheave means and said driven sheave means and effecting disengagement therebetween upon the immobilization of said lug;
(h) signal means connected to said clutch means for selective actuation thereof to thereby transfer driving rotation from said drive sheave means to said driven sheave means and through said roller drive belt to said selected conveyor rollers and including:
 (1) a lug stop member supported on said conveyor and movable into a position to engage and thereby immobilize said lug,
 (2) a signal roller normally positioned above the level of said article conveyor rollers for lowering to said level upon engagement by an article on said conveyor, and
 (3) connecting means connected to said lug stop member and said signal roller and operative to move said lug stop member into a position to engage and immobilize said lug upon the lowering of said signal roller;
(i) said signal roller being supported on crank means rotatably connected to said conveyor;
(j) said lug stop member being rotatably supported on conveyor;
(k) a lug stop lever projecting from said lug stop member; and
 (1) a connecting link connected to said crank means and said lug stop lever to thereby rotate said lug member into a position to immobilize said lug upon the rotation of said crank means effected by the lowering of said signal roller.

* * * * *